United States Patent [19]

Takeda et al.

[11] Patent Number: 5,139,720
[45] Date of Patent: Aug. 18, 1992

[54] METHOD OF PRODUCING SINTERED CERAMIC MATERIAL

[75] Inventors: Shuichi Takeda; Hideki Shishiba, both of Hiratsuka, Japan

[73] Assignee: Kabushiki Kaisha Komatsu Seisakusho, Tokyo, Japan

[21] Appl. No.: 655,413

[22] PCT Filed: Jun. 12, 1990

[86] PCT No.: PCT/JP90/00766
§ 371 Date: Feb. 12, 1991
§ 102(e) Date: Feb. 12, 1991

[87] PCT Pub. No.: WO90/15785
PCT Pub. Date: Dec. 27, 1990

[30] Foreign Application Priority Data

Jun. 12, 1989 [JP] Japan .................. 1-46698
Jul. 10, 1989 [JP] Japan .................. 1-175736

[51] Int. Cl.$^5$ ............................................. F27B 9/04
[52] U.S. Cl. .................................... 264/66; 264/56; 264/65; 264/125; 419/10; 419/11; 419/12; 419/29; 419/42; 419/45; 419/48; 419/53; 419/54; 419/55; 501/87; 501/88; 501/96
[58] Field of Search ............ 419/10, 11, 12, 29, 419/42, 45, 48, 53, 54, 55; 264/56, 65, 66, 125; 501/87, 88, 96

[56] References Cited

U.S. PATENT DOCUMENTS

| | | | |
|---|---|---|---|
| 4,062,985 | 12/1977 | Andersen | 228/241 |
| 4,150,975 | 4/1979 | Miyake et al. | 75/416 |
| 4,689,077 | 8/1987 | Chevigne et al. | 75/233 |

FOREIGN PATENT DOCUMENTS

| | | |
|---|---|---|
| 0165707 | 12/1985 | European Pat. Off. . |
| 0314492 | 5/1989 | European Pat. Off. . |
| 57-166369 | 10/1982 | Japan . |
| 57-166375 | 10/1982 | Japan . |
| 60-226460 | 11/1985 | Japan . |
| 61-186404 | 8/1986 | Japan . |

*Primary Examiner*—Stephen J. Lechert, Jr.
*Attorney, Agent, or Firm*—Armstrong, Nikaido, Marmelstein, Kubovcik & Murray

[57] ABSTRACT

In a method of manufacturing a sintered ceramic material using the heat generated in a thermit reaction as a heating source, a pre-heating is applied preceding to the sintering step or a mixture comprising: (A) at least one ceramic powder, (B) at least one non-metallic powder selected from the group consisting of carbon, boron and silicon, and (C) a metal powder and/or a non-metallic powder other than the above-mentioned (B) is used. Homogeneous and dense sintered ceramic material or sintered composite ceramic material can be obtained by this method, and the fine texture thereof, and the phase constitution, the phase distribution and the like of the composite ceramic phase can be controlled sufficiently.

22 Claims, 5 Drawing Sheets

METHOD OF PRODUCING SINTERED CERAMIC MATERIAL

TECHNICAL FIELD OF THE INVENTION

The present invention concerns a novel method of manufacturing a sintered ceramic material and, more in particular, it relates to a method of manufacturing a sintered ceramic material capable of modifying various characteristics of a sintered ceramic material over a wide range even for a raw material of an identical composition and excellent in the controllability and the homogenity of a fine texture by sufficiently controlling the fine texture in a sintering step for a short period of time depending on the purpose.

The present invention also relates to a method of manufacturing a novel sintered composite ceramic material and, more in particular, it relates to a method of manufacturing a sintered composite ceramic material of extremely good quality in which the phase composition of a composite ceramic, the structure and the distribution of various kinds of constituent phases and the crystal grain size are controlled sufficiently, by conveniently proceeding a thermit reaction under a pressurized state, and utilizing a great amount of heat of reaction obtained in a short period of time.

BACKGROUND OF THE INVENTION

Various characteristics of a sintered ceramic material depends strongly on a fine texture thereof. Accordingly, ceramic sintering methods have been developed, selected and improved as various kinds of heat processing techniques so as to find a method of controlling the fine texture required for attaining aimed characteristics of a sintered ceramic material regarding various factors such as the kind of the raw ceramic powder, characteristics of the material powder, absence or presence of a sintering binder or material of ceramic in the pre-stage of sintering, for example, powder charging ratio of a molding product, crystal structure and physical properties of powder. One of the greatest subjects on the method of manufacturing such a sintered ceramic material is to establish a sintering method having controllability of a fine texture over a wide range capable of attaining aimed characteristics of the sintered ceramic material while ensuring high densification.

Means for dissolving the subject are generally classified into (i) development of a raw sintering powder having high quality and versatile nature, (ii) development of a powder processing technique including, for example, development of various kind of powder molding techniques while taking the performance and the productivity of the sintered material also into consideration, (iii) search for the fine texture controlling agent such as various kinds of binders and (iv) development for sintering and processing technique therefor including, for example, development of a heating method or heat treatment process, for which various research and development have been conducted. However, in an actual sintering process, since the existent powder processing technique and the heat sintering process technology are in an extremely complicate relationship the fine texture greatly varies locally or entirely or often lacks in the reproducibility, also in the sintering of a ceramic powder of constant powder characteristics and molding conditions, due to slight fluctuations of parameters in the sintering process (temperature, heating rate, etc.) or or slight changes such as of inevitable impurities in the powder and mold density.

On the other hand, for the manufacture of a sintered composite ceramic material, a method of sintering and densification by heating for a long period of time has been adopted usually. One of most prominent subjects in the conventional manufacturing method is that it is not possible to obtain a polyphase sintered ceramic material which is dense and comprises fine crystal grains and in which various kind of ceramic phase constitutions in the sintering material is sufficiently controlled in accordance with the purpose. For promoting the densification, there is a press-sintering method, for example, a hot press (HP) or hot isostatic press (HIP) method and, further a high pressure sintering method of applying heating under a higher pressure is also effective. On the other hand, for promoting the densification in a vacuum sintering method or an atmospheric pressure sintering method, various kinds of aids are used to attain the densification by a sort of polyphase composition. However, it is still difficult even by such a means to obtain a polyphase sintered ceramic material in which various kind of ceramic phase constitutions in the sintered material is sufficiently controlled and there has been the following problems.

(1) Crystal grains are grown coarser during the densification tending to leave pores. Further, the coarser growth of the crystal grains forms thermal stresses in the sintered material tending to cause destruction, particularly, in highly anisotropic ceramic.

(2) While addition of aids such as a grain size growth inhibitor is indispensable for preventing crystal grains from growing coarser during sintering under densification, the aids often reduce the characteristics of the sintered material. Further, even in a case of sufficiently modifying raw sintering material into a fine powder and preventing the crystal grain growth by low temperature sintering, it takes a long time for the densification and, also, control for the sintering temperature, time and atmosphere are extremely difficult.

(3) Although the crystal grains can be kept from growing coarser in the sintered material by the means (2) described above, the shape of each of the ceramic phases become indistinct or the attainment of the aimed composite phase constitution is remarkably restricted.

Lack of the controllability for the fine texture caused by the complicate relationship between the powder processing technique and the heat sintering processing technique involves the following problems.

(a) Conventional sintering methods represented, for example, by an atmospheric sintering or vacuum sintering requires a long time for heating and densification the material to be sintered and various kind of sintering mechanisms proceed stepwise or simultaneously in the course of the process. Accordingly, control for the fine texture is very difficult and the fine texture is determined unimeaningly depending on the conditions for attaining the densification of the sintering material (for example, temperature and time). As a result, the controllability for the fine texture is remarkably reduced.

(b) For the promotion and acceleration of the densification, press-sintering method under application of pressure can be adopted. However, in any of hot press (HP), hot isostatic press (HIP) and high pressure sintering method usually employed, since the heating method is similar to indirect heating like that in (a) above, provides relatively a slow heating rate and low controllability, application of the pressure is useful for removal of pores in the sintered ceramic material but does not function sufficiently for the control of the fine texture in the sintered material.

(c) For controlling the heating rate to the powder material to be sintered described in (a) and (b) above, it is considered to apply a current supply sintering method in which electric current is directly supplied to the powder to be sintered and the ohmic heat generation is utilized for heating. For instance, as a method of manufacturing a cermet or a conductive composite ceramic, a current supply hot press sintering method is utilized for shortening the time required for densification (Powder and Powder Metallurgy, vol. 32, No. 6, p 215–218). However, such a method is effective only for the sintering of conductive ceramic or a mixture of a conductive ceramic with a semiconductive or insulative ceramic of a particular composition and can not be applied to the sintering of semiconductive or insulative ceramic. In addition, there is also a drawback that the temperature in the ohmic heat generation varies depending on local fluctuations of the molding density of the sintered powder or the locallized variation of the electric resistance of the powder, thereby causing variation of the temperature distribution in the sintered material and it is difficult to obtain a homogeneous fine texture. In addition, since the electric resistance of the material to be sintered is usually low, the direct current supply heating for the conductive material to be sintered has many difficulties also from an industrial point of view, for example, installation of a great current supply system is indispensable.

(d) Various kinds of sintering binders or sintering aids have been developed as a controlling agent for the fine texture, but the effect of such additives on the sintering mechanism and anticipation for the effect obtained as the result on the characteristics of the sintered material are still insufficient and they are extremely groping. Accordingly, it is difficult to attain a development of new ceramic material having a controlled fine texture under the consideration of various kind of characteristics of the sintered material, unless various results of experiment are obtained and, in addition, there is a not attainable subject not yet overcome for the control of the fine texture in the heat-sintering process as shown in (a), (b) and (c) even when the above-mentioned binders are used.

(e) Although the powder processing technology has been progressed remarkably in recent years, it is extremely difficult, for example, to manufacture a ceramic powder of homogeneous grain size distribution and with no aggregation for the raw material powder in order to obtain a homogenous fine texture and the manufacturing cost is much expensive. In addition, although the technique for uniformly molding a raw material powder, particularly, fine raw material powder, having uniform powder characteristics has been developed partially, for example, as a hot molding technique, it has not yet been completed, and a great care is required for the control of the fine texture, that is, characteristics of the sintered material in the powder process and the heat-sintering process, and there is a difficulty that the characteristics of the sintering material varies greatly depending on slight fluctuations and variations even, if any, of process parameters.

As an attempt for dissolving the foregoing problems, there have been developed various kind of plasma sintering methods (Proceedings of the First International Symposium on Ceramic Components for Engine, 1983, p 710–715) and microwave sintering methods (Ceramic Bulletin, Vol. 68, No. 2, 1989, p 376–386) as another short time sintering method for the promotion of densification and control of the fine texture shown in the problems (a)–(c) described above. The plasma sintering method utilizes super high temperature possessed in plasmas for the sintering under the appropriate control of an atmosphere, which is a process capable of rapidly heating a material to be sintered at an extremely high energy efficiency and it has been reported that densification and the suppression for the grain growth during sintering were attained simultaneously mainly in oxide series ceramics. On the other hand, the microwave sintering method is a cold process using microwaves as a heating means, and it has a feature of generating heat at the inside of the material to be sintered. As a result, it has been reported that rapid and uniform heating was possible irrespective of the size of specimens and the homogenity of the fine texture of the sintered material can be improved.

As another short time sintering method combined with a pressure technology, a simultaneous synthesis and sintering method of ceramic referred to as High-Pressure, Self-Combustion Sintering for Ceramics has been developed by using a so-called SHS (Self-Propagating High Temperature Synthesis) which was studied since 1967 in USSR (refer to Japanese Patent Publication Sho 60-246270 and Comm. Am. Ceram. Soc., c-224-5, 1984, Nov.). The SHS method is a method of self-heating by using a burnable exothermic reaction mixture such as a thermit composition. For example, a ceramic material can be synthesized from a mixture of constituent elements for the ceramic material by using this method without external heating by using heat generating compound forming reaction between each of the elements. An attempt for the simultaneous synthesis and sintering method aims for eliminating pores in the ceramic material to be synthesized through the SHS method by the pressure and manufacturing a dense sintered material in several seconds and it has been reported that a $TiB_2$ sintered material was manufactured under a pressure of 3 GPa only by electric ignition to a pressed mixture of Ti (titanium) and B (boron). The relative density and the hardness of the sintered material were 95% and 2000 kg/mm$^2$ respectively.

Further, as another short time sintering method with application of pressure, a method of densifying and a compacting ceramic material by the combination of Explosive Shock Compaction method with the SHS method has been proposed (refer to U.S. Pat. No. 4,655,830 and Advanced Ceramic Material, Vol. 3, No. 3, p 288–90 (1988)). This method conducts simultaneous synthesis and sintering (type I) or explosure shock compaction and post-shock-heating (type II) of ceramic under a high impact pressure of about several tens GPa in a short period of time. For example, in a micro sec order and it has been reported that a sintered TiC material was synthesized starting from a powder mixture of Ti and carbon as raw material under application of an impact pressure greater than 45 GPa in the type I. The resultant sintered material thus is relatively porous and has micro-hardness of 500–700 kg/mm$^2$. It has been also reported that $TiC-Al_2O_3$ composite ceramic was synthesized by the application of an impact pressure of 45 GPa from a powder mixture of $TiO_2$, carbon and aluminum as the raw material. The micro-hardness of the resultant sintered material was 500 to 700 kg/mm$^2$, intergrain bonding was relatively weak and fine cracks were observed in some places. As the type II method, there has been reported, for example, that the compound exothermic reaction is added for the post-shock-heating element to the shock compaction method for SiC ceramic, in which shock-compaction and post-shock-heating were conducted in a structure comprising a sintered SiC ceramic molding product sandwiched with molding pellets of a mixture of Ti and C. The resultant sintered SiC material had a relative density of 99% and a micro-hardness of 28 GPa.

Further, a 2-step sintering method improved from the conventional sintering method has tended to attract an attention again in recent years for the improvement of single phase ceramic, in particular, the homogeny of the fine texture although this is a densification process requiring a long time reported by (L. C. De. Jonghe, et al). The feature of this method resides in applying a heat treatment at a low temperature (a temperature at which sintering does not proceed substantially) for homogenizing the fine texture preceding to the heat sintering step, and it has been reported that the homogenity of the fine texture was remarkably improved by this low temperature homogenizing treatment. However, a considerable portion of the mechanisms is still not apparent at present and a working example thereof is restricted to oxide ceramics like that in the plasma sintering method described above.

On the other hand, from a view point of the development for the powder processing technique, in the recent study related to the densification of the ceramic and the control of the fine texture, studies have been made vigorously on synthesis and sintering of super fine ceramic raw material powder by a gas phase technique such as plasma synthesis and synthesis and sintering of super fine ceramic raw material powder by a liquid phase method such as a sol-gel method. There has been reported that refinement of the covalent bonding super fine SiC ceramic particles manufactured by a R. F. Plasma CVD process in the sintering step could be promoted considerably with no addition of raw aids (B, C, Al, Be), by the refinement of the raw material powder and the development for the production of composite raw material powders and binder-containing raw material powder (Pre-Print for the Lecture of the Ceramic Society, Part, No. 1, p 427–428, 1986). It is considered that the phenomenon is caused as a result of the promoting effect for the diffusing reaction developed in the sintering step due to the increase of the powder ceramic activity and the increase of the specific surface area or the like by the refinement of the raw material powder. In the sintering of the SiC ceramic powder produced by plasma synthesis, it has been reported that the growth of the crystal grain size could be retained to about several micronmeters even if the hot press sintering temperature was elevated up to 2200° C.

As another example of applying an active plasma-synthesized powder and a super fine powder produced by the gas/solid phase heterogeneous reaction regarding the promotion of densification, controllability for the fine texture and the improvement of the homogeneity in less burnable ceramics, a result of the densification due to vacuum sintering and hot press sintering of $TiB_2$ ceramic has been reported (Journal of the American Ceramic Society, Vol. 67, No. 3, p 207–212 and Advanced Ceramic Materials, described above, Vol. 1, No. 1, 1986, p 50–54). In both of them, the raw material powder is an agglomerate powder with a grain size of less than 1 μm and an extremely active powder. In the vacuum sintering for the plasma-synthesized powder, increase of the relative density to 98–99% was attained by sintering at 1800°–2300° C. also with this less sinterable $TiB_2$ ceramic. On the other hand, in the hot press sintering of a super fine $TiB_2$ powder produced by a solid/gas heterogenous reaction, a sintered material with sufficiently controlled fine texture having a relative density of greater than 99% and a crystal grain size of 2 um was obtained under the presence of a slight amount of Fe and Ni (up to 0.4% in total).

Referring collectively to various kind of recent techniques tried for overcoming the foregoing problems, the technique for the sintering process is, for example, as described below.

(A) The current supply sintering method is effective for conductive ceramic or cermet but it is not applicable to insulative or semiconductive ceramic. Further, it is extremely difficult to simultaneously attain sufficient control for the crystal grain size and the ceramic constituent phase together with the densification.

(B) In the various kind of plasma sintering methods, for example, sintering of $Al_2O_3$ ceramic using R.F. plasmas, there is a difficulty that the heat sintering temperature for the material to be sintered by or plasma heating greatly depends on the deposited amount of water, characteristics of the sintered material vary greatly and the like. Further, in this sintering method, the stability of an oscillator output, sintering time, as well as the stability of gas flow rate and gas pressure of Ar, $N_2$ and $H_2$ or the like give a remarkable effect on the density and the fine texture of the sintered material and it is difficult to simultaneously attain both the high density and the homogenous fine texture and the modification of the fine texture over a wide range.

(C) In the microwave sintering method, there is a principle bar regarding the selectivity for the sintering material that the sinterability is determined depending on the microwave interaction, that is, the degree of absorption by the powder to be sintered. That is, there is a drawback that a conductive ceramic material reflects microwaves making it impossible for heat sintering. Accordingly, for the nature of the material to be sintered, there is a difficulty in view of the design for the sintering material that selectivity is given only to a low loss insulator transparent to the microwave or a combination of a low loss insulator with a lossy insulator as an absorber.

(D) In the high-pressure self-combustion sintering method, since synthesis and press-sintering proceeds without external heating but only by the own compound exothermic reaction, extremely high temperature is formed during sintering synthesis to promote degasing from each of elements, by which the sintered material generally tends to become porous along with the reduction of the pressure. For reducing of the porosity, manufacture of cermet (ceramic phase+metal phase) sintered material has been tried in recent years (Summary of the Proceeding in Autumn Meeting, Society of Powder and Powder Metallurgy, 1986, p 42–43).

In addition, since the synthesis temperature is extremely high and the reaction rate is generally high owing to a so-called self combustion mode of conducting sintering synthesis mainly with the inter-element mixing of compounds forming extremely great heat of reaction, the fine texture is unimeaningly determined depending on the temperature of the synthesis reaction and the cooling rate determined by the heat formed by the inter-element reaction, making it difficult to control the fine texture over a wide range. Further, in the production of a composite ceramic phase, it is difficult to control the constituent phase depending on the purpose, even if the thermodynamic stability of the ceramic phase is taken into consideration.

(E) In the method of manufacturing a composite ceramic using the SHS method under an impact shock pressure, combustive sintering synthesis is possible owing to a sufficiently high pressure caused by impact shock waves and high temperature between particles even if the SHS reaction is not self-sustaining. However, since the time of applying the pressure is as short as micro seconds and generation of high temperature is mainly localized on the surface of the particles, it still involves a drawback that the SHS reaction is not completed or the sintered material is liable to be destroyed due to the occurrence of cracks during rapid ($\mu$ sec. order) pressure elimination. Further, due to the property of the self-combustion mode like that in the high-pressure self-combustion sintering method, and the short time pressure application in the order of micro seconds it is difficult to control the fine texture over a wide range even by the use of post-shock heating.

(F) For the 2-step sintering method, a considerable portion of the mechanism is not still apparent and, in many of reported examples, the anisotropy of the crystal structure of the material and the anisotropy for the grain growth during sintering are moderate. However, since this is a sintering method requiring a long time, even when a homogenzing heat treatment is applied at a low temperature thereby conducting densifying heat sintering, it has a difficulty that the homogenity of the fine texture is tended to be lost depending on the heating rate and the sintering time from the temperature for the homogenizing heat treatment to the main sintering temperature. In particular, in the sintering of less sinterable ceramic having a strong anisotropy, since the range for selecting the optimum heating parameters in the main sintering step is extremely narrow, it is almost impossible at present to attain the homogenity of the fine texture, versatile control and densification.

(G) In the homogenizing sintering method aiming for the densification and the control for the fine texture of the ceramic using a plasma-synthesized powder, powder synthesized by solid/gas phase heterogenous reaction and ceramic powder by the sol-gel method resulting from the development of the powder processing technique, since the powder becomes active due to super fine powderization, a great amount of inevitable impurities are introduced in non-oxide series ceramics and the moldability is reduced remarkably both for the oxide series and non-oxide series ceramics, use of the molding aid or the like is essential, tending to cause scattering in the micro molding density. These drawbacks give a significant effect on the promotion of the densification and the control for the fine texture in the sintering step to leave various problems such as bubbles are left or causing abnormal grain growth is brought about due to the inevitable impurities in the low temperature sintering that utilizes the powder activity.

SUMMARY OF THE INVENTION

An overall object of the present invention is to provide a method of manufacturing a novel sintered ceramic material capable of sufficiently attaining three subjects, that is, densification, control of a fine texture over a wide range and securing of homogeneity that could not be dissolved in the prior art.

Another object of the present invention is to provide a method of manufacturing a sintered ceramic material capable of remarkably reducing heating energy by utilizing heat of chemical reaction as a heat source for sintering.

A further object of the present invention is to provide a method capable of conducting rapid heating and manufacturing a sintered ceramic material of dense fine texture by suppressing grain growth.

A further object of the present invention is to provide a method capable of manufacturing a sintered ceramic material which is homogenous and excellent, for example, in abrasion resistance, heat resistance, corrosion resistance and oxidation resistance.

A further object of the present invention is to provide a method of manufacturing a sintered ceramic material capable of modifying a fine texture variously under the condition of a constant density and also improving the various properties of the resultant sintered material even in the sintering of a less sinterable ceramic, without adding a sintering aid or fine texture controlling agent.

A further main object of the present invention is to provide a method of manufacturing a sintered ceramic material capable of improving the reliability and the performance of the sintered material through the modification of the underlying texture at an extremely micro level, without changing the fine texture of the sintered material and the homogenity of the fine texture, subsequent to the ceramic sintering step.

A further overall object of the present invention is to provide a method of manufacturing a novel sintered composite ceramic material by utilizing heat generated in a thermit reaction that can sufficiently attain the three subjects, that is, densification, refinement for the texture and the control for constituent phases, which could not be overcome in the prior art.

A further object of the present invention is to provide a method of manufacturing an excellent sintered composite ceramic material in which the ceramic constituent phases in the sintered material are sufficiently controlled by extending the range for the kind of thermit reactions utilized, thereby sufficiently controlling the amount of heat applied by the heat generation and applying heating in a short period of time.

A yet further main object of the present invention is to provide a method of manufacturing a composite sintered ceramic material capable of improving the performance and the reliability through the reduction of extremely fine pores without changing the fine texture, phase constitution, structure or the like of the sintered material, subsequent to a manufacturing step of the sintered composite ceramic material by utilizing the heat generated in the thermit reaction.

A still further overall object of the present invention is to provide a sintered ceramic material and a sintered composite ceramic material having a dense fine texture, excellent in various mechanical and chemical properties and extremely useful in the conventional field of ceramic utilization, as well as in various industrial fields requiring higher performance.

For attaining the foregoing objects, in the first aspect of the present invention, there is provided a method of manufacturing a sintered ceramic material, comprising a step of pre-heating a powder to be sintered at a predetermined temperature for a predetermined period of time previously and a step of heat-sintering the powder to be sintered which has been subjected to the pre-heating by heat generated in a thermit reaction under pressure.

According to another mode of the above-mentioned method, there is provided a method of manufacturing a sintered ceramic material, wherein the sintering step by the heat generated in the thermit reaction is followed by heating at a predetermined temperature for a predetermined period of time in order to improve the reliability and the performance of the sintered material without changing the fine texture and the homogenity of the fine texture of the resultant sintered ceramic material.

According to the second aspect of the present invention, there is provided a method of manufacturing a sintered composite ceramic material, in which a mixture comprising (A) at least one ceramic powder, (B) at least one non-metallic powder selected from the group consisting of carbon, boron and silicon powders, and (C) a metal powder and/or a non-metallic powder other than that mentioned powder (B) above is sintered under heating by heat generated in a thermit reaction under pressure.

In a preferred mode of a method of manufacturing a sintered composite ceramic material, a thermit composition for heating the powder mixture to be sintered comprises a mixture of a copper oxide powder and an aluminum powder or a combination of the mixture with a mixture of an iron oxide powder and an Si powder.

In another mode of a method of manufacturing a sintered composite ceramic material, there is provided a method of manufacturing a sintered composite ceramic material, in which the sintering step for the composite ceramic utilizing the heat generated in the thermit reaction according to the method described above is followed by post-heating, preferably, a hot isostatic press or hot press treatment at a temperature of 500° to 1700° C. under a pressure within a range from 200 to 2000 atm for 5 to 60 min., for the reduction of the porosity and the improvement of the reliability and the performance of the resultant sintered composite ceramic, without changing the fine texture, phase composition, structure and the like thereof.

Other objects, as well as advantages and features of the present invention will become apparent to those skilled in the art by the following detailed descriptions.

BRIEF EXPLANATION OF THE DRAWINGS

In the appended drawings,

FIG. 2 is an electron microscopic photograph showing a fine texture of a sintered $TiB_2$ ceramic material with no addition of a binder obtained in Example 1, in which the photograph (A) shows a fine texture of a sintered material obtained only by the heating in the thermit reaction under 20,000 atm from a $TiB_2$ powder without applying preliminary vacuum heat treatment as a comparative example, and photographs (B), (C) and (D) show, respectively, a fine texture for each of sintered materials manufactured by the heating in the thermit reaction under 20,000 atm after applying preliminary vacuum heat treatment each at a temperature of 1300° C., 1500° C. and 1700° C. under a vacuum degree of $2 \times 10^{-10}$ to $1 \times 10^{-4}$ torr.

FIG. 5 is an electron microscopic photograph showing the fine texture of the sintered composite ceramic materials obtained by Example 5 and a conventional method, in which photograph (A) shows a fine texture of sintered $TiB_2$-Ni-B material obtained by a high pressure sintering method in the prior art and photograph (B) shows a fine texture of sintered $TiB_2$-NiB composite ceramic material obtained by the method for manufacturing the sintered composite ceramic material according to the present invention.

FIG. 6 is an electron microscopic photograph showing a fine texture of a sintered composite ceramic material obtained by Example 6 and a conventional method, in which photograph (A) shows a fine texture of sintered Cr-Ni-B series composite material obtained by the vacuum sintering method in the prior art, photograph (B) show a fine texture of a sintered composite material of an identical composition heat-sintered by a thermit reaction under 2000 atm in not self-sustaining SHS reaction and photograph (C) shows a fine texture of a sintered composite ceramic material obtained by a method of manufacturing (under 2000 atm) a sintered composite ceramic material according to the present invention.

DETAILED DESCRIPTION OF THE INVENTION

According to the first aspect of the present invention, there is provided a method of manufacturing a sintered ceramic material capable of simultaneously attaining densification, control for the fine texture over a wide range and the homogenity of the fine texture that is extremely difficult to attain by the usual sintering method.

As described above, densification, control for the fine texture and improvement of the homogenity in the sintered ceramic material have been considered to be an important problem to be overcome in a close relationship with the characteristics of the sintered material as subjects that conflict with each other in the sintering method of the prior art. The sintering method according to the present invention has been deviced so as to overcome the subjects conflicting to each other, i.e., high densification, control of the fine texture over a wide range and improvement of the homogenity, even in a state where a densification promoter, fine texture controlling agent and the like are not present, which were almost impossible in the conventional sintering and it establishes a new ceramic sintering method by overcoming them with a simple method comprising a step of applying a pre-heating treatment to a powder to be sintered and a step of applying heat-sintering for a short period of time by utilizing the heat generated in a thermit reaction under pressure to the powder to be sintered which has been subjected to the pre-heating treatment described above.

The pre-heating is conducted, preferably, by vacuum heating or by an atmospheric heating in an inert atmosphere such as $N_2$, Ar, Ar+$H_2$ or atmospheric air, a reducing atmosphere or an oxidative atmosphere, at a temperature generally higher than 500° C., although it varies depending on the kind of ceramic powder used or the like and the pressure condition upon heat-sintering is properly selected depending on the kind of the ceramic powder used or the like and a pressure within a range higher than 200 atm is usually selected.

In the method of manufacturing the sintered ceramic material according to the present invention, a powder to be sintered which has been subjected to a pre-heating treatment by vacuum heating or atmospheric heating is heated under pressure by a chemical reaction capable of conveniently utilizing heating at high temperature in a short period of time, with a so-called thermit composition. An example of the chemical exothermic reaction for heating the powder to be sintered at a high temperature for a short period of time by using the thermit composition is shown, for instance, by the following equation.

$$Fe_2O_3 + 2Al \rightarrow Al_2O_3 + 2Fe + 204 \text{ kcal} \quad (1)$$

A method of sintering a ceramic powder, a metal powder or a mixture of the ceramic powder and the metal powder by using heat generated in the thermit reaction is disclosed as a heating source in Japanese Patent Laid-Open Sho 61-186404 and U.S. Ser. No. 928,220. However, there has not yet been developed a ceramic sintering method capable of improving the fine texture that gives a remarkable effect on the characteristics of the sintered material over a wide range and improving the homogenity and the reliability simultaneously with densification by previously applying a pre-heating treatment to a powder to be sintered at a predetermined temperature for a predetermined period of time by vacuum heating or atmospheric heating and then applying rapid sintering under pressure for a short time by the heat of the thermit reaction.

The merit of the pre-heating in vacuum or atmosphere in the method of manufacturing the sintered ceramic material according to the present invention is that the activity at the surface of the ceramic powder, inevitable impurities and the like can be controlled variously, as well as that sintering reaction can be partially started, depending on the case, thereby enabling to various control the free energy of the ceramic powder, which is the driving power for the sintering.

Accordingly, the method of the present invention has an excellent merit capable of optionally modifying the characteristics of the powder to be sintered, which are determined unimeaningly, for example, by the various characteristics of the raw material powder, the blending composition, mixing condition, molding property, etc. of the ceramic powder, in particular, by the powder processing technique in the conventional method. It is possible to manufacture a homogenous and highly reliable sintered ceramic material with constant degree of density and a fine texture modified over a wide range, which are excellent features not found in the prior art, by combining the powder to be sintered obtained by the vacuum or atmospheric pre-heating for the powder to be sintered with rapid heating by the thermit reaction under pressure as another feature of the ceramic sintering method according to the present invention. In addition, it is of course possible, as has been described above, to attain densification, control for the fine texture over a wide range and improvement of the homogenity, which were almost impossible in the conventional sintering method, also for a monolithic ceramic that tends to cause abnormal grain growth under a state where a densifying promoter, a fine texture controlling agent or the like is not present.

As has been described above, since the pre-heating treatment to the powder to be sintered and the short time heat-sintering by utilizing the heat generation in the thermit reaction are combined in the method of manufacturing the sintered ceramic material according to the present invention, the following remarkable effects can also be obtained in addition to the main effect described above.

It is possible to modify the fine texture variously and the characteristics of the resultant sintered material can also be improved under the condition of a constant density even in the sintering for a less sinterable ceramic with no addition of a sintering aid or a fine texture controlling agent.

Since the heat of chemical reaction is utilized as a heat source for sintering, heating energy can be reduced remarkably.

It is possible to manufacture a new ceramic material by rapid heat-sintering by the selection for the kind and the blend of the ceramic powder.

In another mode of the method of manufacturing the sintered ceramic material according to the present invention, post-heating treatment is applied subsequent to the ceramic sintering step, without changing the fine texture of the sintered material and the homogenity of the fine texture. As shown in Example 4 described later, various physical properties of the sintered material, such as hardness, heat diffusion coefficient and fracture toughness are improved by the post-heating. However, no meaningful difference is recognized for the shape and the size of the grains in the fine texture of the sintered material before and after the post-heating and, accordingly, it is supposed that the effect of the post-heating is applied through the modification of the underlying texture at an extremely micro level, which can improve the reliability and the performance of the sintered material.

The post-heating is also conducted, preferably, by vacuum heating or atmospheric heating such as an inert atmosphere, a reducing atmosphere or an oxidative atmosphere like that in the pre-heating described above. Further, it is applied to the sintered material under a pressurized state of 1 to 2000 atm, preferably, by a hot isostatic press, hot press or heat treatment under a normal pressure atmosphere. The temperature in the post-heating is within such a range as not changing the fine texture and the homogenity of the fine texture in the resultant sintered ceramic material, which is properly selected depending on the kind or the like of the ceramic powder used, within, a range not higher than the melting point thereof.

In this way, it is possible to manufacture a ceramic material possessing a homogenous fine texture and of high performance and reliability by applying the post-heating subsequent to the ceramic sintering step.

With the method of manufacturing the sintered ceramic material according to the present invention, it is possible to manufacture a ceramic material which is extremely useful industrially. For instance, the sintered $TiB_2$ materials with no addition of binder shown in examples described later can be used as high temperature structural components, corrosion resistant components and electric supply parts due to their excellent abrasion resistance, heat resistance, corrosion resistance, oxidation resistance and conductivity. Meanwhile, sintered $\beta$-$Si_3N_4$ material with no addition of binder can be applied as cutting tools, molten aluminum resistant components and various kind of components for chemical plants in view of their high hardness, excellent oxidation resistance, chemical reaction resistance and heat resistance.

It is of course possible to previously apply a preliminary molding treatment for the powder to be sintered by various kind of lump molding method as such as die molding, cold isostatic molding method and hot isostatic molding method, prior to each of the treatments.

The powder to be sintered applicable to the sintering method by the first aspect of the present invention is not restricted to ceramic powders in a restricted meaning and it should be construed in a more broad meaning. That is, the sintering method described above is applicable not only to various kind of so-called ceramic powders in the restricted meaning but also to a mixture comprising a combination of such a powder properly with various kind of non-metallic powders such as of carbon, boron and silicon and various kind of metal powders such as nickel, chromium, vanadium, niobium, tantalum, molybdenum, tungsten and manganese.

On the contrary, in the method of manufacturing the sintered composite ceramic material according to the second aspect of the present invention, a specific mixture to be sintered is used, in which the thermit heat is utilized and conditioning and selection of the ceramic powder to be sintered are skillfully deviced in order to obtain a sufficiently controlled fine texture for the constitution of the final composite phase, which could not be manufactured so far in the prior art method.

That is, in the method of manufacturing a sintered composite sintered material according to the present invention, a mixture comprising (A) a ceramic powder, (B) a non-metallic element powder selected from the group consisting of carbon, boron and silicon and (C) a metal powder and/or a non-metallic element powder different from that in (B) above is heated with a chemical reaction capable of indirectly attaining heating at high temperature in a short period of time, that is, so-called thermit composition. A method of sintering a ceramic powder, metal powder or mixture of a ceramic powder and a metal powder using heat generated in the thermit reaction as a heat source is disclosed in Japanese Patent Laid-open Sho 61-186404 and U.S. Ser. No. 928,220 as described above. However, it has not yet been developed a highly controlled technique for manufacturing a composite ceramic in which the non-metallic element powder and the metal powder and/or non-metallic element powder different from the former present in the powder mixture to be sintered forms a new ceramic phase due to the heat of the thermit reaction and the resultant composite ceramic material can be densified under sufficient control of the phase constitution and the fine texture in accordance with the purpose by proper mixing of the ceramic powder, the non-metallic element powder, metal powder or the non-metallic element powder different from the former.

The merit of the thermit heating in the manufacture of the composite ceramic as in the method of the present invention resides in that formation of a new ceramic phase is promoted by the instantaneous bonding of the non-metallic element powder and the metal powder and/or the non-metallic element powder different from the former, by applying a great amount of heat to the powder mixture to be sintered in a short period of time. For instance, although the resultant phase is changed depending on the diffusing phenomenon in the synthesis of the ceramic phase by the conventional method, a sintered composite ceramic material can be prepared while rather optionally controlling the final constituent phase by properly selecting the initial composition of the powder mixture. In the method of manufacturing the sintered composite ceramic material using the thermit heating, it is possible to manufacture a sintered composite ceramic material which is dense and not found in the prior art, while forming an aimed new ceramic phase by controlling the amount of the intermediate product and stabilizing the phase composition with excellent feature of the raw ceramic powder, for example, grain size being maintained as it is.

In Japanese Patent Laid-Open Sho 61-186404 described above, it is disclosed that a thermit composition using iron oxide as an oxide and Al, Si, Ti, Mg, Ca and the like as the reducing metal powder is effective. An example of the reaction is shown by the formula (1) described previously.

On the contrary, a thermit composition suitable to be used in the method of manufacturing the sintered composite ceramic material according to the present invention utilizes the reaction:

$$3CuO + 2Al \rightarrow Al_2O_3 + 3Cu + 289 \text{ kcal} \qquad (2)$$

as a heat source of the main chemical reaction and has a merit that the reaction heat which can be taken out effectively per one mol of Al is increased by about 40% as compared with the Al thermit composition in the chemical reaction show in the above-mentioned formula (1). Upon igniting the thermit composition, the ignition energy can be saved by using a Si thermit composition (a mixture of one mol of an Si powder and ⅔ of an iron oxide) together, and the ignition electric power by current supply heating, for example, by a heater can also be reduced. In the method of manufacturing the sintered composite ceramic material, the thermit composition is not limited only to the mixture of the copper oxide powder and the aluminum powder described above but various kind of thermit composition mixtures disclosed in Japanese Patent Laid-Open Sho 61-186404 can of course be utilized as the sintering heat source. A thermit composition comprising a mixture of the copper oxide powder and the aluminum powder is most suitable in that the amount of heat from the chemical reaction that can be effectively taken out per charged amount of the thermit composition.

Also in the method of manufacturing the sintered composite ceramic material, it is possible, as another mode, to apply the post-heating treatment as described above for reducing the porosity and improving the reliability and the performance without changing the fine texture, the phase composition, the structure and the like of the resultant sintered composite material, subsequent to the sintering step for the sintered composite ceramic material by utilizing the heat generation in the thermit reaction. The post-heating treatment in this case is conducted, preferably, as a hot isostatic press or hot press treatment for 5 to 60 min at a temperature of 500° to 1700° C. and under a pressure within a range of 200 to 2000 atm.

In the method of manufacturing the sintered composite ceramic material, the pre-heating treatment to the powder to be sintered may not be applied, in which similar effect as described above can also be obtained. However, it is of course possible to apply the pre-heating treatment and obtain the effect thereby.

As has been described above, in the method of manufacturing the sintered composite ceramic material according to the present invention, it is possible to manufacture a high quality and novel ceramic material in which the fine texture, the phase constitution or the structure and the phase distribution of the sintered composite ceramic material are sufficiently controlled, which are extremely difficult to manufacture in the usual sintering method. That is, in the method of manufacturing the sintered composite ceramic material according to the present invention, since rapid heating under pressure is possible and a portion of the powder to be sintered forms a ceramic phase under the control of temperature, pressure and time, the composition of the ceramic phase, phase structure, distribution for each of the phases and the like can be controlled sufficiently. In addition, there are also obtainable an effect that the heating is conducted for a short period of time and the grain growth or the like can be suppressed and a merit that the heating electric power charged for sintering can be remarkably reduced.

Further, for attaining such effects, combined use of the sintering method for extremely short time by the effective utilization of the heat of the thermit reaction and the skillful controlling method for the powder to be sintered gives an extremely effective means, thereby enabling to manufacture various kind of new sintered composite ceramic materials. As a result, it is possible to manufacture a material which is extremely useful industrially. For instance, the sintered $TiB_2$-NiB material shown in the example was not obtained as a pure 2-phase sintered composite material under the control of the fine texture in the conventional method, and it is applicable to high temperature glass molding parts by utilizing its excellent heat resistance and glass resistance. On the other hand, the sintered $B_4C$-$TiB_2$ material can be applied, for example, to cutting tools and molten aluminum melting components due to its excellent high hardness and oxidation resistance or aluminum resistance. In addition, the sintered $Si_3N_4$-SiC composite material can also be applied as high temperature structural components in view of its homogenity for the fine texture.

DETAILED DESCRIPTION FOR PREFERRED EMBODIMENTS

The method according to the present invention will now be describe more specifically referring to examples but it will be apparent that the present invention is limited to the following examples.

EXAMPLE 1

1.3 g of a $TiB_2$ powder 1 $\mu$m in average grain size (manufactured by Hermann C. Starck Co.) was cold molded into a 12.8 mm disc-shape by using a CIP (cold isostatic pressing) device. The powder molding product was applied with a preliminary vacuum heat treatment by using a vacuum heating furnace. The temperature was set to 1300° C., 1500° C. and 1700° C., respectively, and the products were maintained under a vacuum degree of $2 \times 10^{-3}$ to $1 \times 10^{-4}$ torr each for three hours and then cooled to form powder lumps to be sintered.

As a thermit composition, 34.2 g of a thermit composition prepare by mixing an iron oxide powder and an Al powder at 1:2 molar ratio was divided into two portions and then cold molded each to a size of 30 mm diameter, while 7.7 g of the identical composition was cold molded into a cylindrical form with 30 mm outer diameter and 22 mm inner diameter. Then, the $TiB_2$ lump to be sintered which had been subjected to the preliminary vacuum heating was disposed by way of a thin layer of hexagonal system boron nitride between the two discs and the cylinder made of the thermit. The assembly was placed in a belt-like high pressure generating device.

Figure 1:
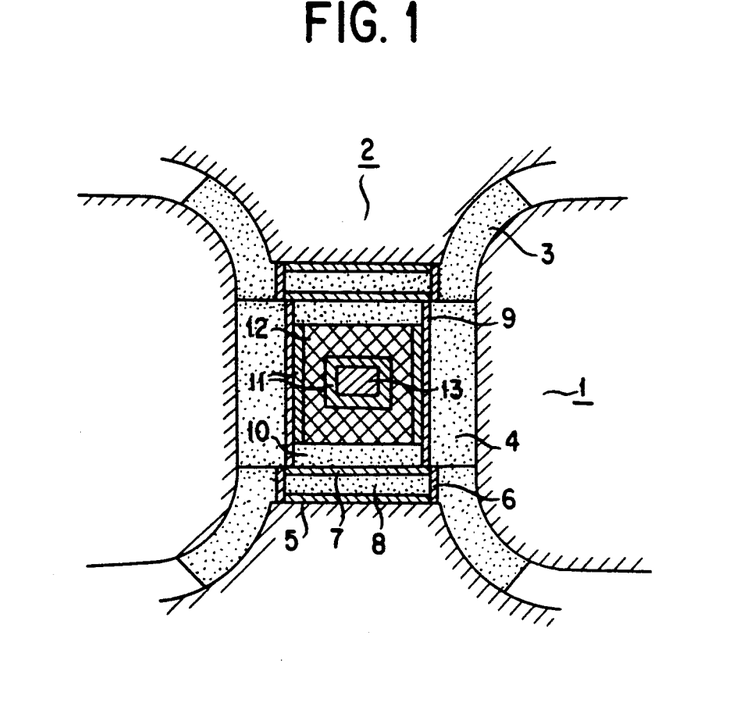
FIG. 1 is a schematic vertical cross sectional view for a main portion of a high pressure generating device used for manufacturing a sintered material in Examples 1 to 3 to be described later.
Figure 2A:
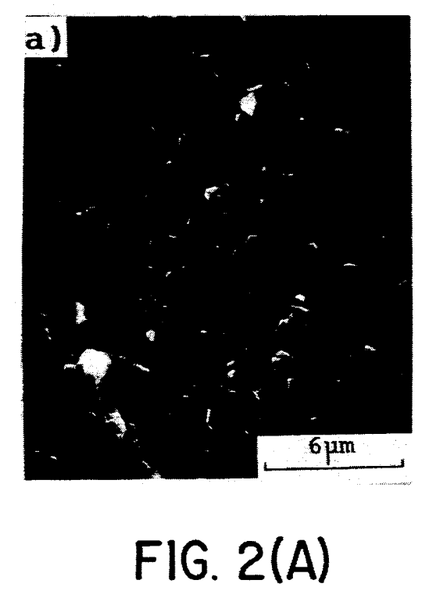
Figure 2B:
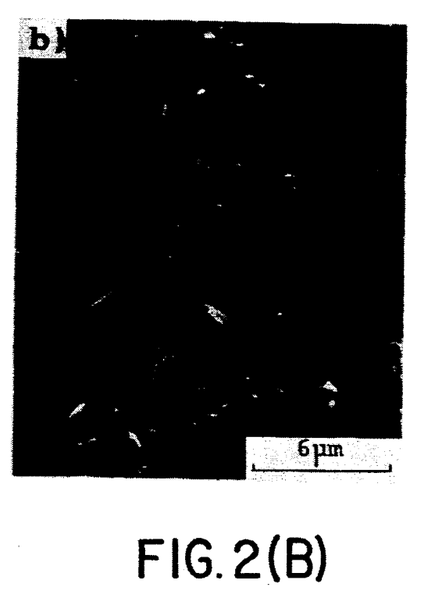
Figure 2C:
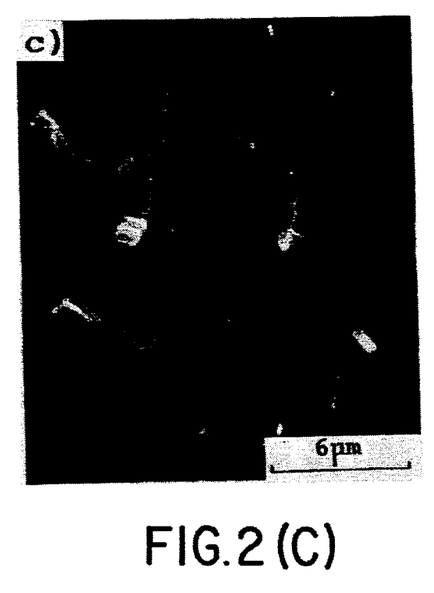
Figure 2D:
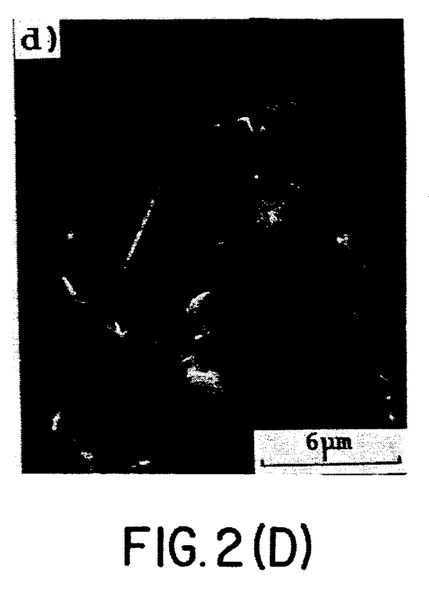

FIG. 1 shows a disposition state in the high pressure generating device. Reference numerals 1 and 2 represent, respectively, a cylinder and an anvil to constitute a high pressure generating vessel. 3 denotes a gasket made of pyrophilite for sealing under pressure. 4 denotes a heat insulator made of pyrophilite. 5, 6 and 7 denote, respectively, a copper plate, a steel ring and a molybdenum plate 8 denotes a ceramic heat insulator, and they constitute an assembly for supplying electric current to a cylindrical carbon heater 9. 10 denotes a heat insulator made of pyrophilite, 11 denotes a thin layer of hexagonal system boron nitride which is served for preventing reaction between the thermit composition 12 comprising the iron oxide and the aluminum powder, and a powder lump 13 to be sintered applied with preliminary vacuum heat treatment and for giving electric insulation to the carbon heater 9. The high pressure generating device described above is operated as below. A load is applied to opposed anvils 2 to generate a pressure of 20,000 atm to a specimen chamber. Electric current is supplied from the opposed anvils 2 to the carbon heater 9 to heat the specimen chamber to 830°-920° C. and the thermit composition 12 was ignited. The amount of heat generated in the thermit in this example was 40 kcal.

Heat sintering for a short period of time to the $TiB_2$ powder to be sintered heated in vacuum by the heat of the thermit reaction was completed at the instance the change of the distance between the anvils was terminated and, after cooling of the specimen portion, the pressure was removed and the sintered $TiB_2$ ceramic material was recovered. The powder to be sintered applied with preliminary vacuum heating shown in this example formed a dense sintered material and had a relative density of greater than 99%.

FIG. 2 shows the result of the observation for the fine texture by an electron microscope on the sintered $TiB_2$ ceramic material obtained in this example. The photograph (A) shows the fine texture of the sintered material manufactured only by the sintering of the thermit heating for the $TiB_2$ powder not applied with the preliminary vacuum heat treatment, in which grain growth does not occur at all and a fine sintered material kept at an average grain size of 1 $\mu$m was obtained. Photographs (B)–(D) show the fine texture of the sintered material after applying sintering by thermit heating for the $TiB_2$ powder to be sintered which had been applied with preliminary vacuum heat treatment according to the present invention. The photograph (B) shows the fine texture of the powder to be sintered applied with the preliminary vacuum heat treatment at 1300° C. for 3 hours, in which $TiB_2$ grains have a structure comprising uniform rod-like particles with 2 to 3 $\mu$m length entangled to each other, and a form that clearly exhibits the anisotropy of the $TiB_2$ ceramic crystals is obtained. The photograph (C) shows the fine texture sintered by thermit heating in a case of applying the preliminary vacuum heat treatment at 1500° C. for an identical, period of time, which has a feature in a structure comprising isotropic crystal forms and with uniform crystal grain size of 1 to 2 $\mu$m and a definite habit. The photograph (D) shows a case in which the preliminary vacuum heat treatment was applied at 1700° C. for an identical period of time, in which a fine texture comprising isotropic grains with uniform grain size of 2 to 5 μm having a definite habit could also be obtained.

As has been described above, the four kinds of sintered materials have substantially the constant density, clearly showing that the sintering method can improve the fine texture over a wide range even for the raw material of an identical composition at the same density while keeping the homogenity. Diboride ceramic is one of typical examples of less sinterable ceramics. For instance, in $TiB_2$ ceramic, densification and control for the grain growth can be attained only in restricted manufacturing conditions even if the ultrafine raw material powder is sufficiently conditioned and micro additive elements are utilized effectively as shown by the subjects left in the prior art, and it is impossible to change the fine texture while keeping the density constant after sintering. It was already reported, for instance, that if the fine texture of the sintered $TiB_2$ material is intended to be changed by the prior art, reduction of the density (remaining or pores) and inhomogenity of the fine texture (presence of various kind of crystal grain sizes from several um to several tens μm) are inevitably caused, and the various characteristics are naturally changed, that is, deteriorated, and the reliability is also reduced remarkably (destruction thermal stress or the like).

As has been described above, various characteristics of the sintered ceramic material strongly depend on the change of the fine texture, and the characteristics of various kind of sintered materials obtained by this sintering method will be examined in comparison. For instance, when the heat diffusion coefficient and the heat conductivity at a room temperature are compared as the thermal nature of the $TiB_2$ ceramics, the heat diffusion coefficient changes as 0.22 $cm^2$sec, 0.26 $cm^2$/sec and 0.34 $cm^2$/sec respectively and the heat conductivity changes as 65 W/m.K, 76 W/m.K and 91 W/m.K respectively in the sintered materials without heat treatment and applied with preliminary vacuum heat treatment at each of temperatures of 1300° C. and 1700° C. Further, $TiB_2$ ceramic is known as a conductive ceramic and, when the specific resistivity at a room temperature is compared respectively like that in the former, it changes as 11.3 μ.ohm-cm, 11.1 μohm-cm and 10.4 μ.ohm/cm respectively. For the mechanical property of the sintered material, difference in various kinds of characteristics becomes apparent such as fracture toughness of the sintered material applied with preliminary vacuum heat treatment at 1300° C. is considerably increased, and the reproducibility for each of the physical property values on every sintering was also excellent.

EXAMPLE 2

As a ceramic powder, 1.3 g of $\beta$-$Si_3N_4$ powder with an average grain size of 0.65 μm and an α-phase ratio of 1% (manufactured by Hermann C. Starck Co.) as cold molded into a disc-like shape of 12.8 mm diameter. The powder molding product was subjected to a preliminary $N_2$ atmosphere heat treatment in a nitrogen atmosphere heating furnace while flowing a $N_2$ gas at 100 ml/min. Heat treatment was conducted each for 4 hours while setting the temperature for the preliminary $N_2$ atmosphere heat treatment to 1500°–1800° C. The powder material to be sintered was charged in the high pressure device shown in FIG. 1 and a sintered ceramic material was manufactured under the same conditions as those in Example 1 except for changing the amount of heat generated from the thermit composition as 30 kcal.

All of $\beta$-$Si_3N_4$ sintered materials obtained in this example formed extremely dense sintered material and had a relative density of greater than 98to 99% even with no addition of a binder. When the fine texture of the resultant sintered material was observed under an electron microscope, grain growth was scarcely observed in the sintered $\beta$-$Si_3N_4$ material applied with the preliminary heat treatment at 1500° C. in the $N_2$ gas stream and the crystal grain size was not greater than 1 μm. The fine texture of the sintered material from the $\beta$-$Si_3N_4$ powder material to be sintered applied with the preliminary heat treatment at 1800° C. in the $N_2$ gas stream comprised a structure in which uniform rod-like particles with 2 to 3 μm length were entangled to each other, which was similar to the fine structure obtained by the usual sintering method with addition of the binder. However, when compared with the sintered material by the usual method under the condition of the constant density, $\beta$-$Si_3N_4$ particles had a remarkable feature in that they were extremely homogenous and fine rod-like material and showed a significant difference relative to the fine texture comprising $\beta$-$Si_3N_4$ of various kind of aspect ratioes grown coarsely as recognized in the usual method.

When characteristics of the sintered materials obtained in this example were compared, Vickers microhardness was 1800 $kg/mm^2$ in a case of applying the preliminary heat treatment at 1500° C. in $N_2$ gas stream, while it was 2000 $kg/mm^2$ in a case of applying the preliminary heat treatment at 1800° C. in the $N_2$ gas stream. When the heat conductivity of the sintered material was compared, the heat conductivity at a room temperature of the sintered material applied with the preliminary heat treatment at 1800° C. in the $N_2$ gas stream was more satisfactory than that of the sintered material applied with the preliminary heat treatment at 1500° C. in the $N_2$ gas stream.

EXAMPLE 3

As a ceramic powder, 3C structure SiC powder (manufactured by Hermann C. Starck Co.) was used and a small amount of boron B (less than 1%) was used as a sintering aid. 1.3 g of a specimen was molded into a disc-like shape with 12.8 mm of diameter by using a CIP device. The powder molding product was applied with a preliminary heat treatment in a vacuum heating furnace. The vacuum heating temperature was set to 1400° C. to 1600° C., while the heating time was set to 2 to 3 hours. The sintered powder material was charged in the high pressure device shown in FIG. 1, and a sintered ceramic material was prepared under the same conditions as those in Example 1 except for changing the amount of heat generated from the thermit composition to 35 Kcal.

All of the SiC sintered materials of 3C structure obtained in this example formed dense sintered material and had a relative theoretical density of greater than 99%. As a result of examining the fine texture of the resultant sintered material, the fine texture of the sintered material of the B-added SiC powder to be sintered applied with the preliminary vacuum heat treatment at 1400° C. for 2 hours had a feature in the homogenous and fine crystal grains with 1 to 2 μm size, while the fine texture of the sintered material of the same powder to be sintered applied with the preliminary vacuum heating at 1600° C. for 3 hours had a feature in the structure in which uniform rod-like particles with about 3 μm length were entangled to each other. In the sintering for SiC ceramic, a method of adding a slight amount of B, C or the like as the sintering aid is used since this is less sinterable ceramic, but is is almost impossible to suppress the abnormal growth of SiC crystal grains along with densification for the sintered material which is nearly in an elemental form by the usual vacuum sintering or hot press sintering. As a result, the fracture toughness of the resultant sintered material is unimeaningly determined depending on the fine texture.

As a result of this example, the fracture toughness of the sintered SiC material comprising fine crystal grains, determined by micro indentation method, was 3 $MN/m^{3/2}$ in a case of applying a preliminary vacuum heat treatment at 1400° C. for 2 hours but was increased up to 6 $MN/m^{3/2}$ as a result of applying a preliminary vacuum heat treatment at 1600° C. for 3 hours.

EXAMPLE 4

For improving the reliability and the performance of the sintered $TiB_2$ material obtained in Example 1, a HIP (hot isostatic press) treatment was applied in an Ar atmosphere under 200 atm. The HIP temperature was set to 1450° C., while the pressurizing time was set to 30 min.

The micro Vickers hardness at a room temperature of thermit sintered $TiB_2$ material applied with a preliminary heat treatment at 1700° C. shown in FIG. 2 (photograph (D)) was 22 GPa, whereas the hardness at a room temperature after the HIP treatment was increased to 21-29 GPa. In addition, the heat diffusion coefficient at a room temperature was also increased by about 10%. When the change of the fine texture was examined in comparison before and after the HIP treatment by the electron microscope, no meaningful difference was recognized for the grain shape, size or the like. In addition, it could be confirmed that the homogenity of the fine texture was kept all over the sintered material. The same effect of the treatment was also confirmed in the hot press (HP) treatment in vacuum atmosphere or a heat treatment in $Ar+H_2$ atmosphere. Details for the processing conditions were at 1400° C. for one hour in the hot press and at 1400° C. for 2 hours in the $Ar+H_2$ atmosphere heating. The processing pressure is different for the HIP treatment, the HP treatment and the atmospheric heat treatment. As a matter of fact, selection for the temperature and the processing time required for the change of the underlying texture of the sintered material at an extremely micro level are different, without changing the fine texture. As the best mode, the HIP treatment or the HP treatment is preferred from an industrial economical point of view.

The fracture toughness of the sintered $TiB_2$ material applied with the HIP treatment had such a high value of 6 $MPa.m^{\frac{1}{2}}$ that was not obtained in the prior art. In this post-heat treatment, test was conducted for 20 specimens in total, in which the performance of the sintered material before and after the HIP treatment was improved substantially at an identical level, showing the extremely high reliability of this post-heat treatment. Although details are not shown for other ceramic materials, similar effects of this treatment were confirmed also for various other materials.

As shown in this example, the post-treatment such as HIP, HP or atmospheric heating for improving the reliability and the performance of the sintered material through the modification of the underlying texture without changing the fine texture of the sintered material and the homogenity of the fine texture, subsequent to the sintering step for the ceramic shown in Example 1 is an extremely effective means in the manufacture of high performance ceramics.

In each of the examples described above, explanation has been made, in particular, to well-known diboride ceramics $Si_3N_4$ and SiC as examples of less sinterable ceramics in each of the examples, but the sintering method according to the present invention is of course applicable to other various kind of ceramics, for example, covalent bonding ceramics (for example, AlN or SiBN), transition metal carbide series, silicide series, oxide series, transition metal nitride series, phosphatized series, sulfide series or mixed series ceramics.

The subsequent examples concern a method of manufacturing a sintered composite ceramic material according to the present invention by utilizing a thermit reaction.

EXAMPLE 5

After weighing 3.2 g of a $TiB_2$ powder of 1 μm in average grain size (manufactured by Hermann C. Starck Co.), 2.9 g of a Ni powder of 0.05 μm of average grain size (manufactured by Shinku Yakin Co.) and 0.64 g of a boron powder of 0.5 μm of average grain size (manufactured by Cerac Co.) and mixing them sufficiently, they were used as a raw mixture for manufacturing a composite ceramic.

Figure 3:
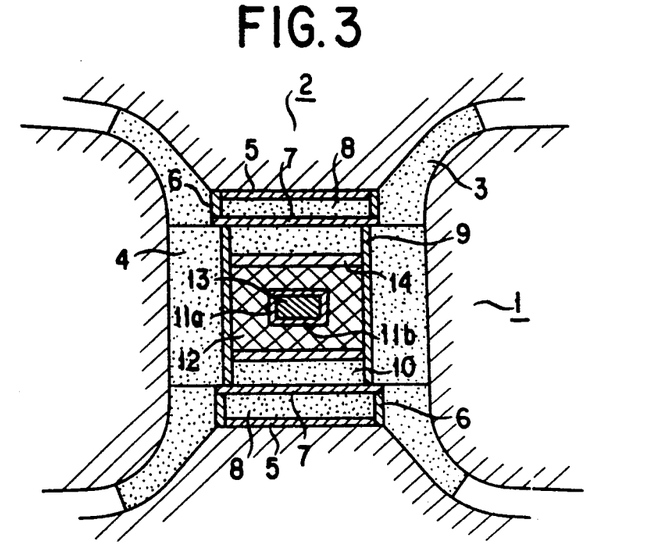
FIG. 3 is a schematic vertical cross sectional view for a main portion of a super high pressure device used for manufacturing a sintered composite ceramic material in Example 5 to be described later.

1.85 g of specimen was sampled from the powder mixture and cold isostatically molded into a disc-like shape of 12.8 mm diameter to prepare a lump mixture to be sintered. As a thermit composition, 22.9 g of a thermit composition prepared by mixing a copper oxide powder and an Al powder at 3:2 molar ratio was divided into two portions and cold molded into a size of 30 mm diameter, while 7.5 g of the same composition was cold molded into a cylindrical form with 30 mm outer diameter and 22 mm inner diameter, and they were disposed by way of a thin layer of hexagonal silicon nitride. 6 g of an Si thermit composition (a mixture of 1 mol of an Si powder and ⅔ mmol of an iron oxide powder which was the same also in subsequent examples) was disposed in adjacent with the disc-like molding product of the thermit composition with 30 mm diameter, and the assembly was charged in a belt-type high pressure generating device. FIG. 3 shows a disposition state in the high pressure generation device. Identical elements as those for the high pressure generating device shown in FIG. 1 carry the same reference numerals and descriptions for such elements are omitted. In FIG. 3, 11a and 11b show, respectively, a cylinder made of hexagonal system boron nitride crystals and a thin layer made of carbon black, which are served for preventing reaction and electric insulation between a thermit composition 12 comprising the iron oxide and aluminum powders and the Si thermit composition 14 and, a heater 9 and the powder lump to be sintered (mixture of $TiB_2$, Ni and B powder) 13. A load was applied to opposed anvils to generate a pressure of 20,000 atm in the specimen chamber and, thereafter, electric current is supplied from the opposed anvils to the heater to heat the specimen chamber. In this example, it has been found that the thermit compositions were ignited spontaneously in the order of the Si thermit composition and the Al thermit composition (powder mixture of copper oxide+Al) to release a great amount of reaction heat by the local heating of the thermit composition due to the charge of the electric power of about 1 KW. The amount of thermit heat generated in this example was 33.8 Kcal. The heat-sintering for the powder to be sintered by the thermit reaction heat was completed at an instance the change of the distance between the anvils was terminated and, after the cooling of the specimen portion, pressure was removed and $TiB_2$ series sintered composite ceramic material was recovered by removing the pressure.

The composite powder to be sintered shown in this example formed a dense sintered material and had a bulk density of 5.02 g/cm$^3$. When the composite phase constituting the sintered material obtained by powder X-ray diffractiometry was identified, it could be confirmed that it was a pure 2-phase sintered composite material comprising $TiB_2$ and Ni.

Figure 5A:
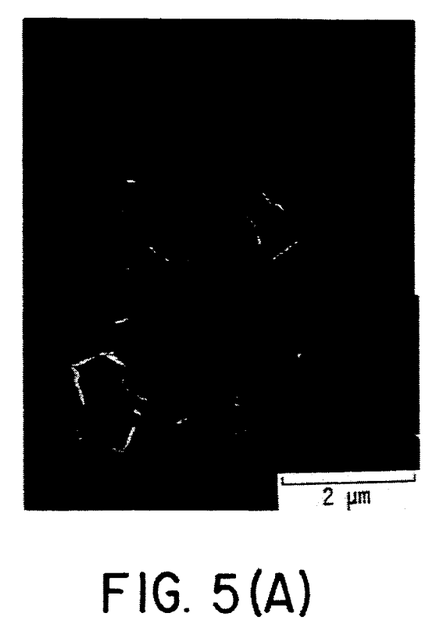
Figure 5B:
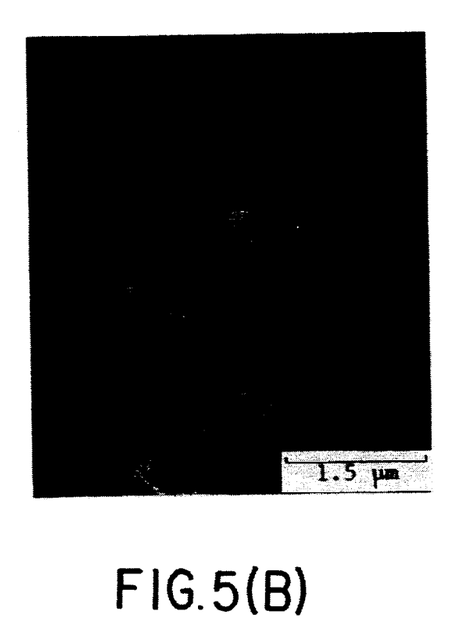

FIG. 5(B) shows the result for the observation of the fine texture in the sintered composite ceramic material obtained in this example by way of an electron microscope. It can be seen that no abnormal grain growth occurs at all for $TiB_2$ ceramic particles and they are bonded extremely satisfactorily by means of NiB ceramic while keeping 1 μm of the average grain size. In the $TiB_2$-Ni-B series sintered composite ceramic material in the prior art, no dense sintered material under such a sufficient control for the fine texture and the phase constitution has not yet been obtained.

FIG. 5(A) shows a fine texture of a sintered material with the identical raw material obtained by a usual high pressure sintering method as a comparative example. The sintering pressure is also 20,000 atm. In the high pressure sintering method, densification can be promoted by compulsorily eliminating pores in the powder to be sintered by the pressure through a moderate heating step for the powder to be sintered. In the manufacture of the sintered material, however, the sintering temperature exceeds 1550° C. the grain growth of $TiB_2$ particles is remarkably accelerated along with the progress of the densification and the grain size of the $TiB_2$ particles as the raw material is grown nearly several to ten times during sintering. $TiB_2$ crystals are known as ceramics having particularly strong crystallographic anisotropy, in which a $TiB_2/TiB_2$ contact portions are increased by abnormal grain growth to result in remarkable thermal stresses with respect to Ni series borides composited therewith, simultaneously, and also increase fracture sensitivity. On the other hand, it is also difficult to stably control the phase of the Ni series borides unimeaningly in such a sintering step with controlling factor in view of time.

$TiB_2$-Ni-B series sintered material prepared by the high pressure sintering method shown in FIG. 5(A) was sintered at 1450° C. for 10 min under a pressure of 20,000 atm for suppressing the abnormal grain growth of $TiB_2$ particles, but uniform dispersion of $TiB_2$ particles was insufficient and a great amount of pores substantially the same as $TiB_2$ particles was observed. In addition, as a result of examining the phase constitution of the sintered composite material by powder X-ray diffractiometry, it consisted of three phases of $TiB_2$, NiB and $Ni_4B_3$ and it was extremely difficult to manufacture $TiB_2$-NiB fine texture of pure 2-phase as shown in FIG. 5(B) even how various sintering conditions (time, temperature and the like) were optimized.

The volumic ratio between $TiB_2$-NiB sintered materials showing the fine texture in FIG. 5(B) was about 6:4.

As other characteristics obtained, the micro Vickers hardness was 14.5 GPa, the average heat expansion coefficient up to 800° C. was $7.7\times10^{-6}$/°C. and the heat conductivity at 800° C. was 0.39 W/cm° C.

EXAMPLE 6

A CrB powder of 2 μm in average grain size (prepared by applying additional pulverization to the product manufactured by Nippon Shinkinzoku Co.), an Ni powder of 2 μm in average grain size and a boron powder of 0.5 μm in average grain size were mixed each at 3.43 g, 2.81 g and 0.62 g in the same way as in Example 5, from which 2.1 g of specimen was sampled and prepared into the same lump mixture to be sintered as in Example 5.

Figure 4:
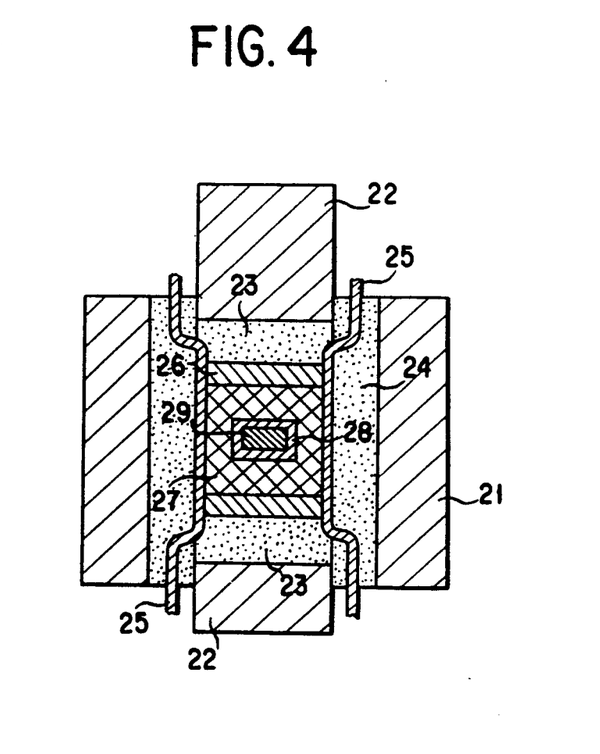
FIG. 4 is a schematic vertical cross sectional view for a main portion of a pressure device of a piston-cylinder type used for manufacturing the sintered composite ceramic material in Example 6.

The lump mixture to be sintered was charged together with an Si thermit composition and an Al thermit composition comprising an Al powder and a copper oxide powder (total heat calorie of 33.8 Kcal) in a piston-cylinder type pressing device shown in FIG. 4 and pressurized to 2,000 atm. Then, by supplying electric current to a electric supply wire 25, the thermit compositions were ignited to prepare a sintered composite material. In FIG. 4, are depicted a cylinder 21, a press punch 22, a plate 23, a cylinder 24, an electric current supply wire 25, an Si thermit composition 26, and an Al thermit composition 27. 28 denotes an intervening layer for preventing the corrosion of the material to be sintered by molten copper from the thermit composition and 29 denotes a sample for the powder mixture to be sintered.

Figure 6A:
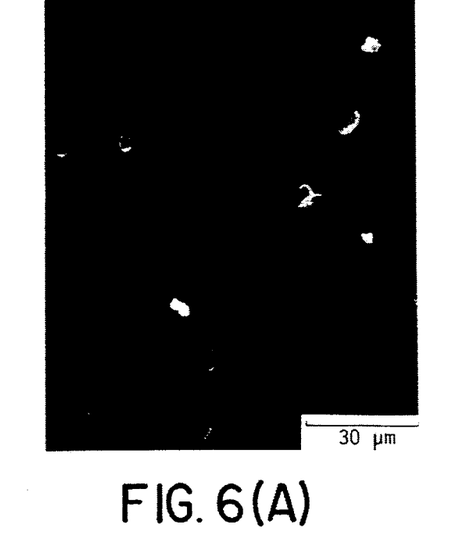
Figure 6B:
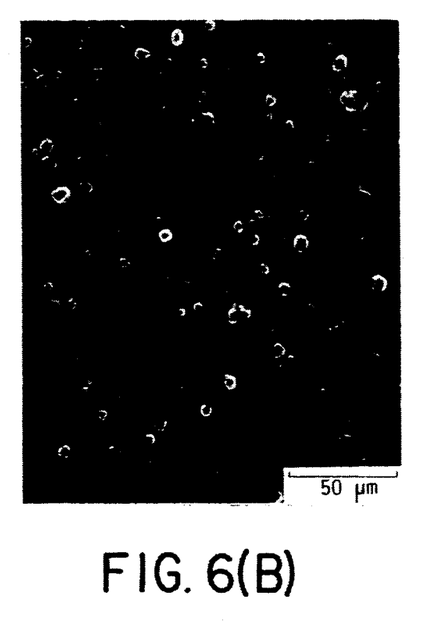
Figure 6C:
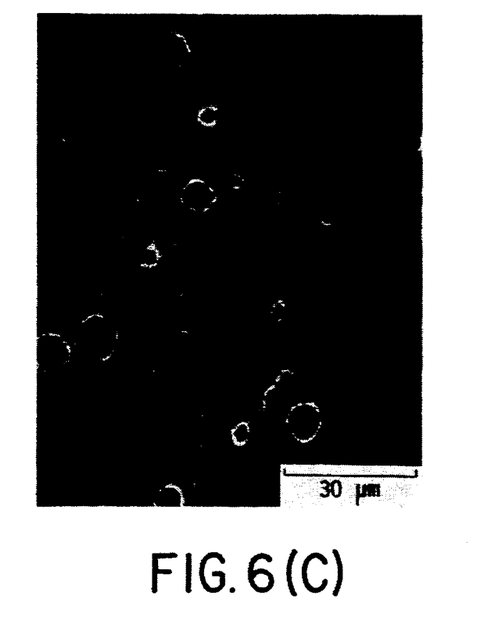

FIG. 6(C) shows the fine texture of the resultant sintered material.

According to the result of X-ray diffractiometry, the sintered material comprised CrB, $(Cr, Ni)_3B_4$, $(Ni, Cr)_4B_3$, $(Ni, Cr)B$ phases, and the fracture toughness was about 6 MNm$^{-3/2}$. It can be said to be a considerably excellent sintered material excepting that pores that seem to be bubbles of less than 2 μm are scattered in the sintered material. As a result of applying a heat treatment at 800° C. in an atmospheric air, the sintered material showed rather preferable oxidation resistance.

The fine texture of the sintered material shown in FIG. 6(A) and (B) are fine textures of Cr-Ni-B series sintered composite material in a case of applying the vacuum sintering method and the heat-sintering by the identical thermit reaction in the not self-sustaining SHS reaction under 2000 atm.

In the sintered material at an identical Cr/Ni/B ratio (raw material is a mixture of CrB of 2 μm and NiB of 1 μm) applied with vacuum sintering at 1500° C., the (Cr, Ni)$_3$B$_4$ phase caused abnormal growth by heat-sintering for one hour as shown in FIG. 6(A), by which the sintered material becomes extremely fragile ($K_{IC}<2$ MNm$^{-2/3}$). On the other hand, a mixed lump to be sintered was prepared by mixing each of elemental powders of Cr, Ni, and B by 5.1 g of Cr, 1.56 g of Ni and 1.35 g of B in the same manner as in Example 5, from which 1.8 g of specimen was sampled to prepare a mixed lump to be sintered and a sintered composite material was manufactured under the same conditions as those in Example 6. The feature of the sintering method resides in conducting sintering by using the thermit reaction heating to the SHS reaction which is not self-sustaining and proceeds entirely from element powder, but a great amount of bubbles of about 10 μm were formed as shown in FIG. 6(B) and it can not be said to be a dense sintered material. As a result of comparing the fine textures of the sintered materials by each of the methods, it is shown that the method of manufacturing the sintered material (FIG. 6(C)) in Example 6 is an extremely excellent method for manufacturing a sintered composite ceramic material.

EXAMPLE 7

A Ti powder of 3 μm in average grain size as a metal powder, a boron powder of 0.5 μm as a non-metallic element powder and a $TiB_2$ powder of 1 μm in average grain size as a ceramic powder were used and a mixed powder to be sintered was prepared by using the mixing method as shown in Example 5 such that the volumic ratio of the mixture of the Ti powder and the boron powder (prepared such that the atom ratio between Ti and boron was 1/1) relative to the $TiB_2$ ceramic powder was 20%, from which 2 g of specimen was sampled and cold isostatically molded into a disc-like shape of 12.8 mm diameter to prepare a mixed lump to be sintered. As a thermit composition, an Si thermit composition and a thermit composition comprising a mixture of an Al powder and an iron oxide were used (total heat calorie of 43.8 Kcal), and charged in the piston-cylinder type pressing device shown in FIG. 4 to manufacture a sintered composite material in the same manner as in Example 6 under 2000 atm.

$TiB_2$ ceramic is known as a high melting less sinterable ceramic and it is extremely difficult to sinter under sufficient control for the density, fine texture and the phase constitution by the usual sintering method. However, by using this method, the following sintered composite ceramic material, for instance, can be available which is dense and under sufficient control for the fine texture.

When the phase constitution of the sintered material was examined by powder X-ray diffractiometry, it was found to be a 2-phase sintered composite material comprising the $TiB_2$ phase and the TiB phase. As a result of examination by both of the means, that is, as a result of the X-ray diffractiometry and the result of the photoelectron spectroscopy by XPS, presence of unreacted Ti and B was not confirmed. Further, the $TiB_2$ particles were of about 1 μm size and grain growth was scarcely recognized.

EXAMPLE 8

In the same manner as in Example 7 except for using $B_4C$ of 0.8 μm in average grain size as a ceramic powder (manufactured by Denki Kagaku Co.), Ti as a metal powder and boron as a non-metallic element powder were mixed such that the volumic ratio of the mixture (prepared such that the atom ratio between Ti and B was ¼) relative to the $B_4C$ ceramic powder, from which 1.5 g of specimen was sampled and prepared into a disc-like mixed lump of 12.8 mm diameter to be sintered. The mixed lump to be sintered was charged in the high pressure generating device shown in FIG. 3 and applied with a pressure of 20,000 atm and then applied with a sintering treatment by the thermit exothermic reaction by the same combination of the Si thermit composition and the mixture of the copper oxide powder and the Al powder.

The sintered material obtained in this example consisted of pure 2-phase $B_4C$ and $TiB_2$ as a result of the powder X-ray diffractiometry and the presence of other unreacted raw material or the like was not recognized. The resultant sintered composite material was dense in which the grain size for each of $B_4C$ and $TiB_2$ was not greater than about 1 μm and the dispersion of $B_4C$ was uniform. The sintered material had a micro Vickers hardness of 3200 $Kg/mm^2$.

EXAMPLE 9

$MoSi_2$ of 2 um in average grain size (manufactured by Nippon Shinkinzoku Co.) was used as the ceramic powder, and carbon black of 0.01 μm in average grain size (manufactured by Cabott Co.) and amorphous silicon of 0.1 μm (manufactured by Komatsu Densi Kinzoku Co.) were used as the non-metallic element powder, and the volumic ratio of the mixture of silicon and carbon black to the $MoSi_2$ powder as set to 30%, 2.5 g of specimen was sampled from the mixture and molded into a disc-like shape of 12.8 mm diameter to prepare a mixed lump to be sintered. The mixed lump to be sintered was charged in the high pressure device shown in FIG. 3 and a sintered composite ceramic material was manufactured under the same conditions of the exothermic thermit reaction as in Example 8 under a pressure of 10,000 atm.

The resultant sintered material was dense and grain growth of $MoSi_2$ particles was scarcely observed. As result of the powder X-ray diffractiometry, a slight $Mo_2C$ phase was confirmed in addition to the $MoSi_2$, SiC (β-phase). In the manufacture of the sintered material, the carbon black was mixed in excess by about 10% than 1/1 SiC/C ratio and the presence of free Si was not observed. It was confirmed by a heating experiment in an atmospheric air at 1000° C. that the sintered material was satisfactory sintered material of excellent heat resistance and oxidation resistance.

EXAMPLE 10

Sintered composition ceramic material was manufactured under the same conditions as those in Example 9 except for using an $Al_2O_3$ powder of 3 μm in average grain size as the ceramic powder (material manufactured from Showa Denko Co. was pulverized for adjusting the grain size), carbon black used in Example 9 as the non-metallic element powder and a Ti powder of 3 μm in average grain size as the metal element powder and setting the volume ratio of the mixture of carbon black and Ti powder to the $Al_2O_3$ powder to 40% (sintered weight 1.5 g).

The resultant sintered material was extremely dense and it could be confirmed from X-ray diffractiometry that it was 2-phase $Al_2O_3$, TiC sintered composite material. The crystal grain size in each of the phases was 3 μm and 1–3 μm respectively and it could be confirmed that extremely preferred inter-granular bonding was attained. The resultant sintered material had micro Vickers hardness of 1700 to 1800 $kg/mm^2$ under the load of 200 g.

EXAMPLE 11

A composite ceramic was manufactured under the same conditions as those in Example 9 except for using a $ZrO_2$ powder of 0.02 μm in average grain size as the ceramic powder (tetragonal system powder stabilized with 1.94 mol % $Y_2O_3$) boron of 0.5 μm in average grain size as the non-metallic element powder and a Ti powder of 3 μm as the metal powder and setting the volume ratio of the mixture of the boron powder and the Ti powder to the $ZrO_2$ powder as 30% (sintered weight of 1.8 g).

The resultant sintered material comprised dense and fine crystal grains as in Example 10 and the resultant sintered material had a fracture toughness $K_{IC}$ of 8 MNm$^{-3/2}$.

EXAMPLE 12

A powder mixture to be sintered was obtained by using a Bi-Si$_3$N$_4$ powder of 0.65 μm in average grain size and α-phase ratio of 1% as the ceramic powder (manufactured by Hermann C. Starck Co.), carbon black and amorphous silicon powders used in Example 9 as the non-metallic element powder and setting the volume ratio of the mixture of silicon and carbon black to the β-Si$_3$N$_4$ powder to 40%. 1.6 g of specimen was sampled from the powder mixture to obtain a disc-like mixed lump to be sintered of 12.8 mm diameter. The mixed lump to be sintered was charged in the high pressure device shown in FIG. 3 and a sintered composite ceramic material was manufactured under the same conditions as those in Example 5 except for changing the heat generation amount of the Si-thermit composition and the thermit composition comprising a mixture of iron oxide and Al powder to 33.8 Kcal.

The resultant composite sintered material comprised a mixture of fine β-Si$_3$N$_4$ and β-SiC and had firm intergranular bonding. When the micro Vickers hardness (under 200 g load) of the sintered material was measured, a value of 2100 kg/mm$^2$ was obtained. As a result of X-ray diffractiometry, unreacted product of silicon and carbon was not confirmed.

EXAMPLE 13

For reducing the porosity and improving the characteristics of the TiB$_2$ and NiB 2-phase sintered composite material obtained in Example 5, a HIP treatment was applied under an Ar atmosphere at 2000 atm. The HIP temperature was set to 800° C. and the time of applying the pressure was set to 30 min. The bulk density was increased by about 10% after the HIP treatment. The heat conductivity at 800° C. was increased to 0.50 W/cm° C. Similar effect of the treatment was confirmed also in the hot press treatment. In the hot press treatment, the bulk density was increased by several % by the application of a pressure of 200 atm at 900° C. for 20 min in vacuum and improvement for the heat conductivity by about 10% was also recognized.

Also for the TiB$_2$-TiB sintered material shown in Example 7, fracture toughness $K_{IC}$ of the sintered material was increased about from 3 to 5 MNm$^{-\frac{3}{2}}$, and the change of the fracture mode from the intra-granular fracture mode to the grain boundary fracture mode was also recognized as the mode of the fracture. However, the treatment with the HIP temperature in excess of 1700° C. or the HIP time in excess of 60 min is not preferred since it remarkably changes the fine texture of the sintered material or lacks in an economical advantage. As shown in this example, the HP or HIP treatment for the reduction of porosity, and the improvement of the reliability and the performance of the sintered material without changing the fine texture, phase constitution or the like of the sintered composite material, applied subsequent to the manufacture of the sintered composite material is extremely effective means in the manufacture of the high performance composite ceramic.

The foregoing explanations are merely for the demonstration of suitable examples in the present invention and the scope of the present invention is not limited to them. Those skilled in the art can easily thought out further various modification examples regarding this invention without departing the scope of the present invention.

We claim:

1. A method of manufacturing a sintered ceramic material which comprises a step of previously applying a pre-heating to a powder to be sintered at a predetermined temperature for a predetermined period of time and a step of applying heat-sintering to the powder to be sintered applied with said pre-heating by the heat generated in a thermit reaction under pressure.

2. A method as defined in claim 1, wherein the pre-heating is conducted by vacuum heating or an atmospheric heating in an inert atmosphere, a reducing atmosphere or an oxidative atmosphere.

3. A method as defined in claim 2, wherein the pre-heating is conducted at a temperature higher than 500° C.

4. A method as defined in claim 1, wherein a preliminary molding is applied previously preceding to the pre-heating.

5. A method as defined in claim 4, wherein the preliminary molding is conducted by a cold isostatic molding or hot isostatic molding method.

6. A method as defined in claim 1, wherein the heat-sintering is conducted under a pressure of higher than 200 atm.

7. A method as defined in claim 1, wherein the sintering step by the heat generated in the thermit reaction is further followed by post-heating at a predetermined temperature for a predetermined period of time for the improvement of the reliability and the performance of the sintered material without changing the fine texture of the resultant sintered ceramic material and the homogenity of the fine texture.

8. A method as defined in claim 7, wherein the post-heating is conducted by vacuum heating or an atmospheric heating is an inert atmosphere, a reducing atmosphere or an oxidative atmosphere.

9. A method as defined in claim 7, wherein the post-heating is conducted under pressure of 1 to 200 atm to the sintered material.

10. A method as defined in claim 8 or 9, wherein the post-heating is conducted by hot isostatic press, hot press or heat treatment under a normal temperature.

11. A method as defined in claim 1, wherein the powder to be sintered comprises one or more of ceramic powder or a mixture of a ceramic powder and a non-metallic and/or metal powder.

12. A method of manufacturing a sintered composite ceramic material, wherein a mixture comprising:
   (A) at least one ceramic powder,
   (B) at least one of non-metallic powders selected from the group consisting of carbon, boron and silicon and
   (C) a metal powder and/or a non-metallic powder different from (B) described above is heat-sintered by the heat generated in a thermit reaction under pressure.

13. A method as defined in claim 12, wherein the thermit composition for heating the powder mixture to be sintered is a mixture comprising a copper oxide powder and an aluminum powder.

14. A method as defined in claim 12, wherein the thermit composition for heating the powder mixture to be sintered comprises a combination of a mixture of a copper oxide powder and an aluminum powder and a mixture of an iron oxide powder and an Si powder.

15. A method as defined in claim 12, wherein the heat-sintering is conducted under a pressure of higher than 200 atm.

16. A method as defined in claim 12, wherein the sintering step for the composite ceramic is followed by post-heating at a predetermined temperature for a predetermined period of time for reducing the porosity and improving the reliability and the performance without changing the fine texture, phase composition, structure or the like of the resultant sintered composite material.

17. A method as defined in claim 16, wherein the post-heating is conducted by vacuum heating or an atmospheric heating in an inert atmosphere, a reducing atmosphere or an oxidative atmosphere.

18. A method as defined in claim 16, wherein the post-heating is conducted by a hot isostatic press, hot press or a heat heat treatment under a normal pressure.

19. A method as defined in claim 16, wherein a hot isostatic press or hot press treatment is applied for 5 to 60 min at a temperature of 500° to 1700° C. and under a pressure within a range of 200 to 2000 atm as the post-treatment.

20. A method as defined in claim 12, wherein the powder mixture to be sintered is previously applied with pre-heating at a predetermined temperature for a predetermined period of time preceding to the sintering step.

21. A method as defined in claim 20, wherein the pre-heating is conducted by vacuum heating or atmospheric heating in an inert atmosphere, a reducing atmosphere or an oxidative atmosphere.

22. A method as defined in claim 21, wherein the pre-heating is conducted at a temperature higher than 500° C.

* * * * *